(12) United States Patent
Yu (10) Patent No.: US 12,487,586 B2
(45) Date of Patent: Dec. 2, 2025

(54) ONLINE WATER PUMP CONTROL AND MANAGEMENT SYSTEM BASED ON REMOTE CONTROL

(71) Applicant: Zhongshan Haibao Appliance Co., Ltd, Guangdong (CN)

(72) Inventor: Derong Yu, Guangdong (CN)

(73) Assignee: ZHONGSHAN HAIBAO APPLIANCE CO., LTD, Guangdong (CN)

( * ) Notice: Subject to any disclaimer, the term of this patent is extended or adjusted under 35 U.S.C. 154(b) by 0 days.

(21) Appl. No.: 17/772,683

(22) PCT Filed: Jan. 25, 2022

(86) PCT No.: PCT/CN2022/073629
§ 371 (c)(1),
(2) Date: Apr. 28, 2022

(87) PCT Pub. No.: WO2023/060805
PCT Pub. Date: Apr. 20, 2023

(65) Prior Publication Data
US 2024/0168463 A1 May 23, 2024

(30) Foreign Application Priority Data
Oct. 15, 2021 (CN) .......................... 202111205161.0

(51) Int. Cl.
*G05B 19/416* (2006.01)
(52) U.S. Cl.
CPC .. *G05B 19/416* (2013.01); *G05B 2219/37371* (2013.01)
(58) Field of Classification Search
CPC ............... G05B 19/416; G05B 2219/37371
See application file for complete search history.

(56) References Cited

U.S. PATENT DOCUMENTS

| | | | | |
|---|---|---|---|---|
| 11,216,643 | B1 * | 1/2022 | Madden | G08B 25/10 |
| 2015/0342143 | A1 * | 12/2015 | Stewart | A01K 5/0283 |
| | | | | 119/51.02 |
| 2016/0192619 | A1 * | 7/2016 | Gibbs | A01K 29/005 |
| | | | | 119/61.5 |

FOREIGN PATENT DOCUMENTS

| | | | | |
|---|---|---|---|---|
| CN | 211931989 U | * | 11/2020 | |
| CN | 112858617 A | * | 5/2021 | |
| WO | WO-2013040853 A1 | * | 3/2013 | ............ F04B 49/065 |

OTHER PUBLICATIONS

Sun, Pet Water dispenser, 2020, google patents, note this is a machine translation of CN211931989 (Year: 2020).*

(Continued)

*Primary Examiner* — Robert E Fennema
*Assistant Examiner* — Yvonne Trang Follansbee
(74) *Attorney, Agent, or Firm* — McClure, Qualey & Rodack, LLP (57) ABSTRACT

An online water pump control and management system based on remote control, including a drinking water demand collection terminal setting module, a data storage library, a drinking water demand judgment and identification module, an automatic water supply regulation and control module, a water pump operating parameter collection module, an online remote control module of water dispenser pump operation and a daily pet drinking water management terminal. In the present invention, drinking water demand parameters of target objects are identified to flexibly regulate and control water supply of one or more water pumps in pet water dispensers on demands, and operating parameters of the one or more water pumps are collected when regulating and controlling water supply to determine whether an operating fault occurs in water pumps, and the operating parameters are transmitted to a mobile remote control terminal in time to control remotely operating faults of the water pumps.

8 Claims, 1 Drawing Sheet

(56) References Cited

OTHER PUBLICATIONS

Jiang, Cloud computing-based system and method for management and control of water pump, 2013, google patents, note this machine learning of WO2013040853 (Year: 2013).*

Long, Fault identification method and device of online water quality monitor, 2021, google patents, note this is a machine translation of CN112858617 (Year: 2021).*

* cited by examiner

ONLINE WATER PUMP CONTROL AND MANAGEMENT SYSTEM BASED ON REMOTE CONTROL

TECHNICAL FIELD

The present invention belongs to the technical field of water pump regulation and management, in particular to an online water pump control and management system based on remote control.

BACKGROUND TECHNOLOGY

With development of social economy and acceleration of urbanization, the independence, individualization and population aging of urban families have become increasingly prominent; and residents' leisure, consumption and emotional sustenance methods have developed in a diversified manner. Raising pets has become an important part of leisure and emotional sustenance for more and more residents. And with rising in the number of pets, there is a growing demand for smart pet water dispensers.

Pet water dispensers often comprise water storage tanks, one or more water pumps, outlets and water trays, wherein one or more water pumps serve as power mechanisms of pet water dispensers and pump water out of the storage tanks through outlets so as to offer drinking water for pets. It is thus clear that one or more water pumps play an important role in the control of pet water dispensers, and there is no doubt that the control effect of one or more water pumps has become a most concerned issue when a pet owner selects a pet water dispenser. However, all one or more water pumps in existing pet water dispensers perform a dissatisfied control effect and have following defects:

a. inflexible water supply control: water supply amount of existing pet water dispensers controlled by the one or more water pumps is fixed, suitable to be applied to only a single kind of pets; and when there are many kinds of pets in a family, standard water amounts corresponding to single drinking water for different kinds of pets are not the same, as a result, it is liable that a single drinking water demand of one kind of pets is not met or over satisfied if unified water supply control is adopted, such that, pets' health will be threatened in case of unmet water demands, and excess water will be wasted if too much water is supplied; and b. no water pump operation safety control: at present, pet water dispensers control water supply with the one or more water pumps, and most existing pet water dispensers cannot make analysis to water pump operations, as a result, one or more water pumps cannot be remotely controlled and treated when there is an operating fault, and water supply safety of pet water dispensers cannot be guaranteed.

SUMMARY OF THE INVENTION

In view of aforesaid defects of the prior art, the present invention provides an online water pump control and management system based on remote control. In the present invention, drinking water demand parameters of target objects are identified so as to flexibly regulate and control water supply of one or more water pumps in pet water dispensers on demands, and operating parameters of one or more water pumps are collected in real time when regulating and controlling water supply so as to determine whether an operating fault occurs in one or more water pumps, and the operating parameters are meanwhile transmitted to a mobile remote control terminal in time to perform remote controls over operating faults of one or more water pumps, and thus overcome defects of existing pet water dispensers in control of one or more water pumps.

The present invention is implemented through following technical solutions:

An online water pump control and management system based on remote control comprises:

a drinking water demand collection terminal setting module configured to arrange a drinking water demand collection terminal on a pet water dispenser;

a data storage library used for storing appearance characteristics corresponding to names of existing pets, standard single drinking water amounts corresponding to the names of the existing pets, and safe operating parameters of one or more water pumps corresponding to the pet water dispenser, wherein the safe operating parameters include ranges of safety values corresponding to motor rotation frequency, motor working voltage, motor working current and motor working temperature;

a drinking water demand judgment and identification module which is connected with the drinking water demand collection terminal setting module and the data storage library respectively, such that, whether there is a drinking water demand is judged through the drinking water demand collection terminal, and if there is a drinking water demand, identify drinking water demand parameters, wherein the drinking water demand parameters include names of pets having drinking water demands, drinking water amounts and drinking water moments;

an automatic water supply regulation and control module which is connected with the drinking water demand judgment and identification module, and used for automatically regulating and controlling water supply of the water pumps according to identified drinking water demand parameters;

a water dispenser pump operating parameter collection module which is connected with the automatic water supply regulation and control module, and used to collect water pump operating parameters at a preset collection time interval during water supply regulation and control of the water pumps; and an online water dispenser pump remote control module which is respectively connected to the water dispenser pump operating parameter collection module and the data storage library, and used to comprehensively analyze the water pump operating parameters of the pet water dispenser, and then determine whether the water pumps have an operating fault, wherein if there is an operating fault, obtain at least one operating fault attribute label, and transmit to a mobile remote control terminal at a fault time point, so as to perform online remote control over the operating fault.

In a preferential technical solution of the present invention, the drinking water demand collection terminal comprises an infrared scanner and an automatic tracking camera.

In a preferential technical solution of the present invention, operational steps for judging whether there is a drinking water demand are as follows:

I. carrying out real-time scanning according to a preset scanning mode by the infrared scanner, wherein if a target object is scanned at a certain moment, starting the automatic tracking camera to track the target object at this moment, and collecting movement images of the target object in real time;

II. focusing on a head position of the target object on the collected movement images corresponding to the target object, and then extracting head action features; and III. matching the extracted head action features with pre-drinking head action features, wherein if the head action features extracted from the collected movement image of the target object at a certain moment are matched successfully, it is judged that the target object has a drinking water demand at the certain moment, and recording the movement image of the target object collected at the certain moment as a selected movement image of the target object.

In a preferential technical solution of the present invention, a method for identifying the drinking water demand parameters is performed in accordance with following steps:

step 1. extracting appearance characteristics corresponding to the target object from the selected movement image of the target object;

step 2. matching the appearance characteristics of the target object with appearance characteristics corresponding to the names of the existing pets in the data storage library, sifting out a name of a pet corresponding to the target object and marking as the name of a drinking water demand pet;

step 3. Comparing the name of the pet with the drinking water demand to names of the pets which have corresponding standard single drinking water amounts recorded in the data storage library, obtaining a standard single drinking water amount corresponding to a name of the pet with the drinking water demand, and taking as a drinking water demand amount; and step 4. taking the certain moment when the movement image of the selected target object is collected as a drinking water demand moment.

In a preferential technical solution of the present invention, the water supply regulation and control process of the water pumps comprises:

obtaining a current water amount in a corresponding water tray of the pet water dispenser through a water level detector provided thereon at the drinking water demand moment;

comparing the current water amount in the water tray with the drinking water demand, wherein if the current water amount is more than or equal to the drinking water demand amount, the one or more water pumps in the pet water dispenser will not be started to supply water; otherwise, the one or more water pumps will be started to supply water, and meanwhile, a regulated water supply amount will be obtained by subtracting the current water amount from the drinking water demand amount;

obtaining a water flow rate at a water outlet of the pet water dispenser, and calculating standard operation time of the one or more water pumps according to the regulated water supply amount and the water flow rate of the water outlet; and after the one or more water pumps start working, recording actual operation time of the one or more water pumps and comparing with the standard operation time of the one or more water pumps, and controlling the one or more water pumps to stop working when the standard operation time of one or more water pumps is reached.

In a preferential technical solution of the present invention, the operating parameters include motor rotation frequency, motor working voltage, motor working current and motor working temperature.

In a preferential technical solution of the present invention, the operation procedure for determining whether there is an operating fault is as follows:

step 1: dividing the standard operation time of the one or more water pumps according to a preset collection time interval, and obtaining divided collection time points, so as to obtain operating parameters of the one or more water pumps corresponding to each of the collection time points; and step 2: comparing the operating parameters of the one or more water pumps corresponding to each of the collection time points with the safe operating parameters of the corresponding one or more water pumps of the pet water dispenser in the data storage library, wherein if at least one of the operating parameters of the one or more water pumps corresponding to a certain collection time point does not fall into a range of the safety values corresponding to the operating parameter, determining that the one or more water pumps have an operating fault, recording the certain collection time point as a fault time point, and recording the at least one of operating parameter as an operating fault parameter.

In a preferential technical solution of the present invention, the operating fault attribute label includes an operating fault type and an operating fault degree value, wherein a method for obtaining the operating fault attribute label includes following steps:

step 1: extracting an upper limit value and a lower limit value of the at least one of the operating parameters in a safety range corresponding to the operating fault parameter from the data storage library, and recording as the upper safety limit value and the lower safety limit value respectively;

step 2: comparing a value corresponding to the operating fault parameter with the upper safety limit value and the lower safety limit value respectively, wherein if the value of the operating fault parameter is less than the lower safety limit value, an operating fault corresponding to the operating fault parameter is a low-level type, and if the value of the operating fault parameter is greater than the upper safety limit value, the operating fault is a high-level type; and step 3: if the operating fault corresponding to the operating fault parameter is a low-level type, subtracting the value corresponding to the operating fault parameter from the lower safety limit value to obtain a fault comparison value, and dividing the fault comparison value by the lower safety limit value to get the operating fault degree value corresponding to the operating fault parameter; if the operating fault corresponding to the operating fault parameter is a high-level type, subtracting the upper safety limit value from the value corresponding to the operating fault parameter to obtain the fault comparison value, and dividing the fault comparison value by the upper safety limit value to get the operating fault degree value corresponding to the operating fault parameter.

In a preferential technical solution of the present invention, a method for remotely controlling the operating fault of the one or more water pumps is to shut down and maintain the pet water dispenser via a remote control mobile terminal.

In a preferential technical solution of the present invention, the online water pump control and management system based on remote control further comprises a daily pet drinking water management terminal, which is connected with the drinking water demand judgment and identification module, and is used to evaluate, manage and display daily drinking water normal indexes of pets with the drinking water demands every day, and a specific management process thereof is conducted in accordance with following steps:

S1: counting how many times drinking water demands occur every day and then obtaining the drinking water demand parameters corresponding to each of the drinking water demands every day according to the above processing method of the drinking water demand judgment and identification module;

S2: when each of the pets finishes drinking water to fulfill the drinking water demands thereof, obtaining actual water consumption of each of the pets corresponding to each of the drinking water demands;

S3: extracting names of the pets having drinking water demands from the drinking water demand parameters corresponding to each of the drinking water demands, and comparing to classify the drinking water demands corresponding to the names of the pets having the same drinking water demand, and obtaining drinking water demand sets corresponding to the names of the pets having various daily drinking water demands;

S4: numbering the names of the pets having various daily drinking water demands as 1, 2, . . . , i, . . . , n, and calculating how many times totally the drinking water demands occur from the drinking water demand sets corresponding to the names of the pets having various daily drinking water demands, so as to mark each of the drinking water demands according to a temporal sequence of drinking water demand judgment, and numbering as 1, 2, . . . , j, . . . , m;

S5: calculating drinking amount compliance indexes of each of the drinking water demands corresponding to each of the names of the pets drinking water every day and marking the same as $\eta_i j$;

S6: calculating drinking time regularity indexes corresponding to each of the names of the pets drinking water every day, and marking the same as $\xi_i$;

S7: based on the drinking amount compliance indexes and the drinking time regularity indexes corresponding to each of the drinking water demands of each of the names of the pets drinking water every day, calculating daily water drinking normal indexes as per a following formula $$\varphi_i = \frac{\sum_{j=1}^{m} \eta_i j}{m} + \xi_i,$$

wherein $\varphi_i$ represents the daily water drinking normal indexes corresponding to a name of an "i"th water drinking pet, $\eta_i j$ represents drinking amount indexes of coincidence corresponding to a "j"th drinking water demand of the name of the "i"th water drinking pet, $\xi_i$ represents a drinking time regularity index corresponding to the name of the "i"th water drinking pet; and transmitting a value of the $\varphi_i$ to the remote control mobile terminal.

In combination with the above-mentioned technical solutions, it is concluded that the present invention has following beneficial effects:

I. In the present invention, a drinking water demand collection terminal is arranged on a pet water dispenser so as to judge whether there is a drinking water demand and identify drinking water demand parameters when the drinking water demand is determined, and one or more water pumps are flexibly regulated to start or stop by comparing a current water amount in a water tray to the drinking water demand so as to supply water on demands and increase flexibility of water supply; and the water amount in the water tray is regulated to be more consistent with a single drinking water demand amount of a pet, thereby effectively avoiding waste of water caused by an unified water output regulation and overcoming the drawbacks that pets' single drinking water demand cannot be fulfilled. Thus, water resources are saved to a certain extent and a balance between drinking water supply and water resources conservation is achieved.

II. While regulating and controlling water supply of the one or more water pumps, the present invention collects operating parameters of one or more water pumps based on a preset collection time interval so as to analyze and determine whether the one or more water pumps have operating faults; when the one or more water pumps have an operating fault, an operating fault attribute label is obtained and transmitted to a remote control mobile terminal at a fault moment, and a remote control over the operating fault of the one or more water pumps is then carried out by a remote control mobile terminal user, so that a pet owner can timely get knowledge of operating faults on the one or more water pumps of the water dispenser. And the remote control mode adopted in the present invention can guarantee the water supply safety of the pet water dispenser in real time, and avoid water supply safety hazards caused by water pump operating faults, so as to not only protect the pet water dispenser itself from being damaged, but also avoid being affected and damaged when pets drink normally.

III. A daily pet drinking water management terminal is arranged in the present invention so as to evaluate and manage pets' daily water intake normal indexes, and pet owners can remotely and directly know daily drinking water conditions of pets having drinking water demands, and provide a reliable reference to assess the health of pets having drinking water demands.

BRIEF DESCRIPTION OF THE DRAWINGS

The present invention will be further described by accompanying drawings. However, embodiments in the accompanying drawings do not constitute any limitation to the present invention. For those of ordinary skill in the art, other drawings can also be obtained according to the following drawings without creative work.

SPECIFIC EMBODIMENTS

Figure 1:
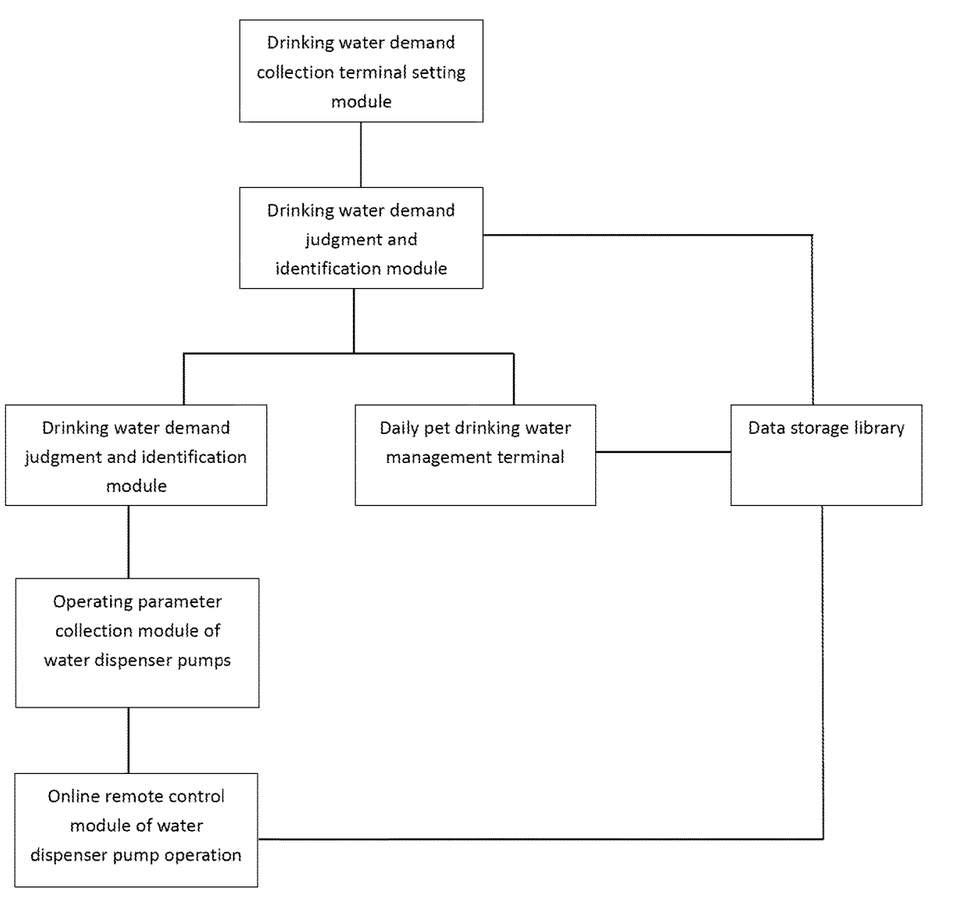
FIG. 1 is a schematic diagram of a module connection structure of the present invention.

The technical solutions in embodiments of the present invention will be clearly ad completely described below with reference to accompanying drawings in embodiments of the present invention. Obviously, the described embodiments are only some embodiments of the present invention rather than all embodiments. Based on the embodiments of the present invention, all other embodiments obtained by those of ordinary skill in the art without making creative efforts belong to the protection scope of the present invention.

Please refer to FIG. 1, disclosed is an online water pump control and management system based on remote control, comprising:

A drinking water demand collection terminal setting module used for arranging a drinking water demand collection terminal on a pet water dispenser, wherein the drinking water demand collection terminal comprises an infrared scanner and an automatic tracking camera, the infrared scanner is used to scan target objects, and the automatic tracking camera is used to track movements of the target objects; and it should be noted that why the infrared scanner is selected in embodiments of the present invention to scan target objects is that the infrared scanner scans and makes judgments based on the infrared radiation of measured objects themselves; so the infrared scanner can only scan for living objects, but not for inanimate objects; and when non-pet inanimate objects come into contact with the pet water dispenser, the automatic tracking camera will not be started, which avoids waste of equipment resources, and achieves targeted scanning of the target objects.

A data storage library is used for storing appearance characteristics of names of all existing pets, single drinking standard water amounts corresponding to the names of all the existing pets, and safe operating parameters of corresponding one or more water pumps of the pet water dispenser, wherein the safe operating parameters include ranges of safety values corresponding to motor rotation frequency, motor working voltage, motor working current and motor working temperature; and the data storage library further includes lengths of regular drinking time intervals between two adjacent drinking water demands corresponding to the names of all the existing pets; and it should be noted that the ranges of safety values mentioned above includes both upper limit values and lower limit values.

A drinking water demand judgment and identification module is connected with the drinking water demand collection terminal setting module and the data storage library respectively, and used to judge whether there is a drinking water demand through the drinking water demand collection terminal, and operational steps for judging whether there is a drinking water demand are as follows:

I. carrying out real-time scanning according to a preset scanning mode by the infrared scanner, wherein the preset scanning mode adopts a circumferential scanning with a pet water dispenser as a center, and if a target object is scanned at a certain moment, starting the automatic tracking camera to track the target object at this moment, and collecting movement images of the target object in real time;

II. focusing on a head position of the target object on the collected movement images corresponding to the target object, and then extracting head action features; and III. matching the extracted head action features with pre-drinking head action features, wherein if the head action features extracted from the collected movement images of the target object at a certain moment matches successfully, it is judged that the target object has a drinking water demand at the certain moment, and recording the movement image of the target object collected at the certain moment as a selected moving image of the target object.

The pre-drinking head action features mentioned in embodiments of the present invention specifically refers to head action features when the target object extends its head into the water tray; and drinking water demand parameters are identified if there is a drinking water demand, wherein the drinking water demand parameters include drinking water demand pet names, drinking water demand amounts and drinking water demand moments; and a method for identifying the drinking water demand parameters is performed in accordance to following steps:

step 1. extracting appearance characteristics corresponding to the target object from the selected movement image of the target object, wherein the appearance characteristics comprise shapes, colors, configurations and so on;

step 2. matching the appearance characteristics of the target object with appearance characteristics corresponding to the existing pet names in the data storage library, sifting out a pet name corresponding to the target object and marking as a drinking water demand pet name;

step 3. comparing the drinking water demand pet name to pet names which have corresponding standard single drinking water amounts recorded in the data storage library, obtaining a standard single drinking water amount corresponding to the drinking water demand pet name, and taking as a drinking water demand amount; and step 4. marking the moment when the moving image of the selected target object is collected as a drinking water demand moment.

The drinking water demand parameters are identified in embodiments of the present invention, which provides a basis for subsequent controls over water supply of the one or more water pumps.

An automatic water supply regulation and control module is connected with the drinking water demand judgment and identification module, and used for automatically regulating and controlling water supply of the water dispenser pumps according to identified drinking water demand parameters, wherein the water supply regulation and control process of water dispenser pumps comprises:

obtaining a current water amount in a corresponding water tray of the pet water dispenser through a water level detector provided thereon at the drinking water demand moment;

comparing the current water amount in the water tray with the drinking water demand amount, wherein if the current water amount is more than or equal to the drinking water demand amount, one or more water pumps in the pet water dispenser will not be started to supply water; otherwise, the one or more water pumps will be started to supply water at this moment, and meanwhile, a to-be-regulated water supply amount will be obtained by subtracting the current water amount from the drinking water demand amount;

obtaining a water flow rate at a water outlet of the pet water dispenser, and dividing the to-be-regulated water supply amount by the water flow rate at the water outlet to obtain a standard operation time of the one or more water pumps; and after the one or more water pumps start working, recording an actual operation time of the one or more water pumps and comparing with the standard operation time of the one or more water pumps, and controlling the one or more water pumps to stop working when the standard operation time of the one or more water pumps is reached.

In an embodiment of the present invention, a drinking water demand collection terminal is arranged on the pet water dispenser so as to determine whether there is a drinking water demand and identify drinking water demand parameters when a drinking water demand is determined, and the one or more water pumps are regulated to start or stop operation according to the comparison of a current water amount in a water tray and a drinking water demand amount so as to achieve the purpose of supplying water on demands, increase the flexibility of water supply control, so that a regulated water amount in the water tray is more consistent with a single drinking standard water amount of pets which have drinking water demands, thereby effectively avoiding waste of water caused by an unified water supply regulation mode and overcoming drawbacks that pets' single drinking water demand cannot be fulfilled, thus, water resources are saved to a certain extent and a double balance of drinking water supply and water resources conservation is achieved.

An operating parameter collection module of water dispenser pumps is connected with the automatic water supply regulation and control module, and used to collect water pump operating parameters according to a preset collection time interval during a water supply regulation and control process of the water pumps, wherein the operating parameters include a motor rotation frequency, a motor working voltage, a motor working current and a motor working temperature; and An online water pump remote control module is respectively connected to the operating parameter collection module of water dispenser pumps and the data storage library, and used to comprehensively analyze the water pump operating parameters of the pet water dispenser, and then determine whether the water dispenser pumps have an operating fault, and an operation procedure for determining whether there is an operating fault is as follows:

step 1: dividing the standard operation time of one or more water pumps according to a preset collection time interval, and obtaining divided collection time points, so as to obtain operating parameters of the one or more water pumps corresponding to each of the collection time points; and step 2: comparing the operating parameters of the one or more water pumps corresponding to each of the collection time points with the safe operating parameters of the corresponding one or more water pumps of the pet water dispenser in the data storage library, wherein if a certain operating parameter of the one or more water pumps corresponding to a certain collection time point is not within a range of a safety value corresponding to the operating parameter, the one or more water pumps are determined to have an operating fault, the certain collection time point is recorded as a fault time point, and the certain operating parameter is recorded as an operating fault parameter.

If there is an operating fault, obtain an operating fault attribute label and the operating fault attribute label includes an operating fault type and an operating fault degree value, wherein a corresponding method for obtaining the operating fault attribute label includes following steps:

step 1: extracting an upper limit value and a lower limit value of an operating parameter corresponding to an operating fault parameter in a safety range from the data storage library, and recording as the upper safety limit value and the lower safety limit value;

step 2: comparing a value corresponding to the operating fault parameter with the upper safety limit value and the lower safety limit value respectively, if the value corresponding to the operating fault parameter is less than the lower safety limit value, the operating fault is a low-level type, and if the value corresponding to the operating fault parameter is greater than the upper safety limit value, the operating fault is a high-level type; and step 3: if the operating fault corresponding to the operating fault parameter is a low-level type, subtracting the value corresponding to the operating fault parameter from the lower safety limit value to obtain a fault comparison value, and dividing the fault comparison value by the lower safety limit value to get an operating fault degree value corresponding to the operating fault parameter; and if the operating fault corresponding to the operating fault parameter is a high-level type, subtracting the upper safety limit from the value corresponding to the operating fault parameter to obtain a fault comparison value, and dividing the fault comparison value by the upper safety limit value to get an operating fault degree value corresponding to the operating fault parameter.

In a specific embodiment of the present invention, to obtain the operating fault attribute labels of water dispenser pumps is good for targeted maintenance and treatment on the water pump operating faults thereafter, which therefore to a large extent avoids low efficiency working caused by blind maintenance and treatment.

The operating fault attribute label is transmitted to a mobile remote control terminal at a fault time point to perform online remote control over the water pump operating fault, wherein the mobile remote control terminal can be a mobile phone, a remote control mode thereof specifically includes shutting down the pet water dispenser and conducting remote maintenance control over the pet water dispenser by users of the remote mobile terminal, and the remote maintenance control mode includes contacting a maintenance manufacturer of the pet water dispenser for timely maintenance according to the transmitted operating fault attribute label.

While regulating and controlling water supply of one or more water pumps, in an embodiment of the present invention, operating parameters of one or more water pumps based on a preset collection time interval are collected so as to analyze and determine whether the one or more water pumps have operating faults. When the one or more water pumps have an operating fault, an operating fault attribute label is obtained and transmitted to a remote control mobile terminal along with a fault time point, remote control over the water pump operating fault is carried out by a remote control mobile terminal user, so that the pet owner can timely get knowledge of operating faults on the one or more water pumps of the pet water dispenser, and the remote control mode adopted in the present invention can guarantee water supply safety of the pet water dispenser in real time, and avoid water supply safety hazards caused by water pump operating faults, so as to not only protect the pet water dispenser itself from being damaged, but also protect the pets from being affected and damaged during drinking, and in the meanwhile, remote repair of the operating faults of the pet water dispenser can realize timely repair of the operating faults of the one or more water pumps when the pet owners are not in, and the pet water dispenser can be ready for use quickly.

A daily pet drinking water management terminal is connected with the drinking water demand judgment and identification module, and used to evaluate, manage and display daily drinking water normal indexes of drinking water demand pets every day, and a specific management process thereof is conducted in accordance with following steps:

S1: according to the above processing method of the drinking water demand judgment and identification module, counting how many times drinking water demands occur every day and then obtaining drinking water demand parameters corresponding to each of the daily drinking water demands;

S2: when each pet finishes drinking water each time to fulfill each drinking water demand thereof, obtaining an actual water consumption amount of each pet corresponding to each of the drinking water demands, wherein a method for obtaining the actual water consumption amount is as follows: firstly detecting water amount in a drinking water container by a water level detector on the drinking water container after regulating water supply of the one or more water pumps corresponding to each of the drinking water demands, then detecting a remaining water amount in the drinking water container through the water level detector on the drinking water container after each pet finishes drinking, and deducting the remaining water amount in the drinking water container after each pet finishes drinking from the water amount in the drinking water container after regulating water supply to obtain the actual water consumption corresponding to each drinking water demand of pets;

S3: extracting pet names having drinking water demands from the drinking water demand parameters corresponding to each drinking water demand, and comparing with each other to classify drinking water demands corresponding to the pet names having same drinking water demands, and obtaining drinking water demand sets corresponding to the pet names having various daily drinking water demands;

S4: numbering the pet names having various daily drinking water demands as 1, 2, ..., n, and calculating a total number of times of drinking water demands from the drinking water demand sets corresponding to the pet names having various daily drinking water demands, so as to mark each drinking water demand according to a time sequence of drinking water demand judgment, and number as 1, 2, ..., j, ..., m;

S5: calculating each drinking amount index of coincidence corresponding to each drinking water demand of each daily water drinking pet name and marking the same as $\eta_i j$, wherein the $\eta_i j$ is calculated by extracting drinking water demand amounts from drinking water demand parameters of drinking water demands corresponding to daily water drinking pet names, and comparing with actual drinking water amounts; the drinking water demand amounts of drinking water demands corresponding to daily drinking water pet names are marked as $q_i j$ and the actual drinking water amounts are marked as $p_i j$; a formula to calculate the $\eta_i j$ is as follows:

$$\eta_i j = \frac{\sqrt{q_i j} + 1}{\sqrt{|p_i j - q_i j|} + 1},$$

specifically, $\eta_i j$ represents a drinking amount index of coincidence for a "j"th drinking water demand corresponding to an "i"th water drinking pet name, $q_i j$ represents a drinking water demand amount for a "j"th drinking water demand corresponding to the "i"th water drinking pet name, $p_i j$ represents an actual water consumption for the "j"th drinking water demand corresponding to the "i"th water drinking pet name, and the closer a drinking water demand is to an actual drinking water amount, the greater a drinking water amount index of coincidence is, consequently the higher a coincidence degree of the a drinking water amount is;

S6: calculating a drinking time regularity index of coincidence corresponding to each daily water drinking pet name in a following way: extracting drinking water demand moments from the drinking water demand parameters of the drinking water demands corresponding to the daily water drinking pet names, comparing adjacent drinking water moments of the drinking water demands corresponding to names of pets with the same water drinking demand so as to obtain drinking water time intervals of adjacent drinking water demands corresponding to each of the names of the pets with the same water drinking demand, then calculating a mean value to obtain an average drinking time interval of adjacent drinking water demands corresponding to each same water drinking pet name, and marking the same as $\varepsilon_i$ to compare with regular drinking time intervals corresponding to adjacent drinking demand of each pet name in the data storage library, wherein the drinking time regularity indexes of coincidence corresponding to each daily water drinking pet name is calculated as per a following formula $$\xi_i = \frac{\sqrt{\varepsilon_i'} + 1}{\sqrt{|\varepsilon_i - \varepsilon_i'|} + 1},$$

specifically, $\xi_i$ represents a drinking time regularity index of coincidence of the "i"th water drinking pet name, $\varepsilon_i'$ represents for regular drinking time intervals of adjacent drinking water demands corresponding to the "i"th water drinking pet name, $\varepsilon_i$ represents for an average drinking time interval of adjacent drinking water demands corresponding to the "i"th water drinking pet name, and the closer an average drinking time interval is to a regular drinking time interval, the greater a drinking time regularity index of coincidence is, indicating the higher a coincidence degree of the drinking time regularity is;

S7: employing drinking amount indexes of coincidence and drinking time regularity indexes of coincidence corresponding to each drinking water demand of each daily water drinking pet name to calculate normal indexes of daily water drinking as per a following formula $$\varphi_i = \frac{\sum_{j=1}^{m} \eta_i j}{m} + \xi_i,$$

wherein $\varphi_i$ represents normal indexes of daily water drinking corresponding to an "i"th water drinking pet name, $\eta_i j$ represents drinking amount indexes of coincidence corresponding to a "j"th drinking water demand of the "i"th water drinking pet name, $\xi_i$ represents a drinking time regularity index of coincidence corresponding to the "i"th water drinking pet name; and displaying the $\phi_i$ to the remote control mobile terminal.

A daily pet drinking water management terminal is arranged in an embodiment of the present invention so as to evaluate and manage pets' daily water intake normal indexes, and pet owners can remotely intuitively and directly understand daily drinking conditions of pets having drinking water demands, and provide a reliable reference basis for assessing health of pets having drinking water demands.

In the present invention, water supply of one or more water pumps in pet water dispenser can be flexibly adjusted on demands, and operation safety controls thereof can be performed remotely, which greatly improves current control effects of one or more water pumps in a pet water dispenser, makes the pet water dispenser more convenient and conducive to improving the pet's experience of the pet water dispenser.

The foregoing are only examples and descriptions of structures of the present invention. Various modifications or additions to the specific embodiments described herein or equivalent replacements can be made by those skilled in the art, and all of the modifications, additions and equivalent replacements shall belong to the protection scope of the present invention as long as not deviating from the structures of the present invention.

The invention claimed is:

1. An online water pump control and management method based on remote control, comprising:
arranging a drinking water demand collection terminal on a pet water dispenser;
storing appearance characteristics corresponding to names of existing pets, standard single drinking water amounts corresponding to the names of the existing pets, and safe operating parameters of one or more water pumps corresponding to the pet water dispenser, wherein the safe operating parameters include ranges of safety values corresponding to motor rotation frequency, motor working voltage, motor working current and motor working temperature;
judging whether there is a drinking water demand through the drinking water demand collection terminal, and if there is a drinking water demand, identifying drinking water demand parameters, wherein the drinking water demand parameters include names of pets having drinking water demands, drinking water amounts and drinking water moments;
automatically regulating and controlling water supply of the water pumps according to identified drinking water demand parameters;
collecting water pump operating parameters at a preset collection time interval during water supply regulation and control of the water pumps; and
analyzing the water pump operating parameters of the pet water dispenser, and then determining whether the water pumps have an operating fault, wherein if there is an operating fault, obtaining at least one operating fault attribute label, and transmitting to a mobile remote control terminal at a fault time point, so as to perform online remote control over the operating fault;
wherein operational steps for judging whether there is a drinking water demand are as follows:
I. carrying out real-time scanning according to a preset scanning mode by the infrared scanner, wherein if a target object is scanned at a certain moment, starting the automatic tracking camera to track the target object at this moment, and collecting movement images of the target object in real time;
II. focusing on a head position of the target object on the collected movement images corresponding to the target object, and then extracting head action features; and
III. matching the extracted head action features with pre-drinking head action features, wherein if the head action features extracted from the collected movement image of the target object at a certain moment are matched successfully, it is judged that the target object has a drinking water demand at the certain moment, and recording the movement image of the target object collected at the certain moment as a selected movement image of the target object.

2. The online water pump control and management method based on remote control according to claim 1, wherein the drinking water demand collection terminal comprises an infrared scanner and an automatic tracking camera.

3. The online water pump control and management method based on remote control according to claim 1, wherein a method for identifying the drinking water demand parameters is performed in accordance to following steps:
step 1. extracting appearance characteristics corresponding to the target object from the selected movement image of the target object;
step 2. matching the appearance characteristics of the target object with appearance characteristics corresponding to the names of the existing pets, sifting out a name of a pet corresponding to the target object and marking as the name of a drinking water demand pet;
step 3. Comparing the name of the pet with the drinking water demand to names of the pets which have corresponding standard single drinking water amounts recorded, obtaining a standard single drinking water amount corresponding to a name of the pet with the drinking water demand, and taking as a drinking water demand amount; and
step 4. taking the certain moment when the movement image of the selected target object is collected as a drinking water demand moment.

4. The online water pump control and management method based on remote control according to claim 1, wherein the water supply regulation and control process of the one or more water pumps comprises:
obtaining a current water amount in a corresponding water tray of the pet water dispenser through a water level detector provided thereon at the drinking water demand moment;
comparing the current water amount in the water tray with the drinking water demand, wherein if the current water amount is more than or equal to the drinking water demand amount, the one or more water pumps in the pet water dispenser will not be started to supply water; otherwise, the one or more water pumps will be started to supply water, and meanwhile, a regulated water supply amount will be obtained by subtracting the current water amount from the drinking water demand amount;
obtaining a water flow rate at a water outlet of the pet water dispenser, and calculating standard operation time of the one or more water pumps according to the regulated water supply amount and the water flow rate of the water outlet; and
after the one or more water pumps start working, recording actual operation time of the one or more water pumps and comparing with the standard operation time of the one or more water pumps, and controlling the one or more water pumps to stop working when the standard operation time of one or more water pumps is reached.

5. The online water pump control and management method based on remote control according to claim 1, wherein the operating parameters include motor rotation frequency, motor working voltage, motor working current and motor working temperature.

6. The online water pump control and management method based on remote control according to claim 1, wherein operation procedures for determining whether there is an operating fault are as follows:
    step 1: dividing the standard operation time of one or more water pumps according to a preset collection time interval, and obtaining divided collection time points, so as to obtain operating parameters of the one or more water pumps at each of the collection time points; and
    step 2: comparing the operating parameters of the one or more water pumps corresponding to each of the collection time points with the safe operating parameters of one or more water pumps corresponding to the pet water dispenser, wherein if a certain operating parameter of the one or more water pumps corresponding to a certain collection time point is not within a range of a safety value corresponding to the operating parameter, the one or more water pumps are determined to have an operating fault, recording the certain collection time point as a fault time point, and recording the certain operating parameter as an operating fault parameter.

7. The online water pump control and management method based on remote control according to claim 1, wherein the operating fault attribute label includes an operating fault type and an operating fault degree value, wherein a corresponding method for obtaining the operating fault attribute label includes following steps:
    step 1: extracting an upper limit value and a lower limit value of the at least one of the operating parameters in a safety range corresponding to the operating fault parameter, and recording as the upper safety limit value and the lower safety limit value respectively;
    step 2: comparing a value corresponding to the operating fault parameter with the upper safety limit value and the lower safety limit value respectively, wherein if the value of the operating fault parameter is less than the lower safety limit value, an operating fault corresponding to the operating fault parameter is a low-level type, and if the value of the operating fault parameter is greater than the upper safety limit value, the operating fault is a high-level type; and
    step 3: if the operating fault corresponding to the operating fault parameter is a low-level type, subtracting the value corresponding to the operating fault parameter from the lower safety limit value to obtain a fault comparison value, and dividing the fault comparison value by the lower safety limit value to get the operating fault degree value corresponding to the operating fault parameter; if the operating fault corresponding to the operating fault parameter is a high-level type, subtracting the upper safety limit value from the value corresponding to the operating fault parameter to obtain the fault comparison value, and dividing the fault comparison value by the upper safety limit value to get the operating fault degree value corresponding to the operating fault parameter.

8. The online water pump control and management method based on remote control according to claim 1, wherein a method for remotely controlling over water pump operating faults comprises shutting down and repairing the pet water dispenser via a remote control mobile terminal.

* * * * *